June 24, 1947.  B. BOGOSLOWSKY  2,422,944
APPARATUS FOR MAKING COFFEE INFUSIONS

Filed April 19, 1945

INVENTOR
Boris Bogoslowsky
BY
Emery, Varney, Whittemore & Dix
ATTORNEY

Patented June 24, 1947

2,422,944

UNITED STATES PATENT OFFICE 2,422,944

APPARATUS FOR MAKING COFFEE INFUSIONS

Boris Bogoslowsky, Jackson Heights, N. Y.

Application April 19, 1945, Serial No. 589,225

2 Claims. (Cl. 99—286)

This invention relates to apparatus for making an infusion of coffee suitable for use as a beverage.

In my prior copending application Serial No. 498,914, filed August 17, 1943, I have described and claimed a method and apparatus for making an infusion of coffee in which roasted coffee beans are ground in a sealed container having its sole discharge passage submerged in and sealed by hot water in which the infusion is to be made, and in which the ground coffee, together with the carbon dioxide gas released by the grinding are discharged directly and continuously from the sealed container through said discharge passage into the hot water at a point below the surface thereof. In this manner, the flavor constituents carried by the gas released by the grinding are absorbed into the water with consequent improvement in the flavor of the coffee infusion.

It is an object of the present invention to provide an improved apparatus for carrying out said method.

Other objects and advantages of the invention will appear hereinafter.

Figure 1:
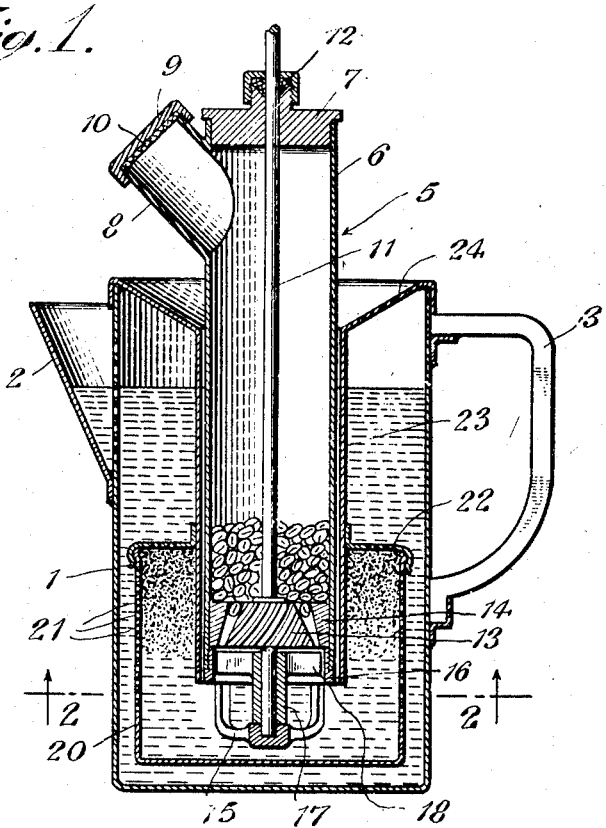

A preferred embodiment of the invention selected for purposes of illustration is shown in the accompanying drawings, in which, Figure 1 is a vertical section through the apparatus.

Figure 2:
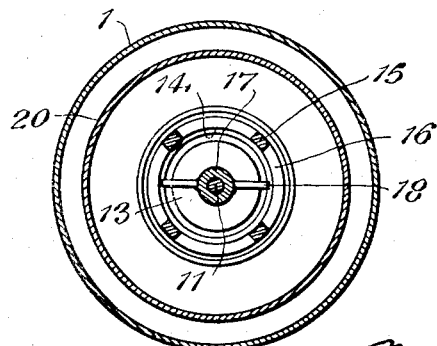

Figure 2 is a section on the line 2—2 of Figure 1.

As set forth in my copending application, above referred to, in studies which have been made of coffee in the past, it has been found that a considerable quantity of carbon dioxide gas is generated in coffee beans in the roasting process. It has also been found that a gradual loss of the carbon dioxide so generated occurs after roasting, and that the degree of such loss furnishes a reasonably direct measure of the loss of flavor value of the coffee. That is, freshly roasted coffee which contains the maximum carbon dioxide content is full flavored, whereas roasted coffee which has been stored for a considerable period of time under conditions which permit loss of its original carbon dioxide content is stale and weak in flavor. It appears therefore that the carbon dioxide serves as a carrier for the flavor constituents of the coffee, and that the carbon dioxide gas which is lost carries off valuable flavor constituents as it escapes.

It has also been found that a large proportion of the carbon dioxide content of roasted coffee beans is lost during the grinding process which is commonly resorted to preparatory to making a coffee infusion for beverage use. The finer the grind the greater the loss, but the loss may amount to 40% to 60% of the original carbon dioxide content of the roasted beans which are ground.

Furthermore it has been found that after grinding, the ground coffee loses its remaining carbon dioxide content far more rapidly than the bean. As a result if two identical samples of roasted coffee beans are selected, and one sample is retained unground and exposed to atmosphere for a period of one week and the other sample is ground and retained under the same conditions for the same period, the unground sample will lose relatively little of its carbon dioxide content, perhaps 5% to 10%, and hence will lose little of its flavor, while the ground sample will lose a large part of its carbon dioxide content, perhaps 75% to 80%, and hence will lose a large part of its flavor.

Various expedients have been resorted to in order to prevent such loss. Coffee has been packed in sealed tins, sometimes under vacuum, but in the case of ground coffee this fails to prevent the large loss which occurs during grinding and the subsequent loss which occurs as soon as the tin is opened. Frequent and rapid delivery of ground coffee to the consumer has also been resorted to and widely publicized, but again this fails to prevent the losses above noted. There has also been a reversion to an older practice of selling coffee to the consumer in the bean for grinding by the consumer immediately before preparing an infusion. While this practice prevents the rapid loss which occurs after coffee is ground, and thus results perhaps in less loss than by any other method, it still fails to prevent the loss which occurs during the grinding operation, which loss is the most serious of all.

The apparatus of the present invention operates in accordance with the method described in my copending application, above referred to. Thus, as therein described, I grind coffee beans in a sealed container having its sole discharge passage submerged in and sealed by hot water in which the infusion is to be made, and I discharge the ground coffee and carbon dioxide gas released by such grinding directly into the hot water in order that the flavor constituents carried by the released gas may be absorbed by the hot water, and in order that the flavor constituents remaining in the ground coffee may be absorbed by the hot water with minimum opportunity for loss of such flavor constituents to the atmosphere.

Thus, referring to the drawings, I provide a hot water container 1 which may be of any desired size and shape, and which may be heated in any suitable manner, as by a flame or by an electric heating element. According to well established practice, the optimum temperature for making a coffee infusion is slightly below the boiling point of water at normal atmospheric pressure, although I include within the term "hot water" as used in this specification the normal range of temperatures used for making coffee infusions, as from 170° F. to 212° F.

The container may be made of any suitable material such as metal or glass or any of the other materials commonly used for coffee makers, and in the case of small sizes intended for household use may be provided with a spout 2 and a handle 3. In the case of larger sizes intended for restaurant or hotel use, the container may be of the usual urn type.

Mounted to project into the container 1 is a grinder unit 5 which may be supported in any suitable manner as by a table or wall bracket, not shown. The unit comprises a tubular shell 6 having its upper end sealed by a bearing member 7, and having a threaded neck 8 through which roasted coffee beans may be introduced. After the desired quantity of coffee beans has been introduced, the neck is closed and sealed by a threaded closure cap 9 having a gasket 10 adapted to provide an air tight closure, thus providing a sealed compartment containing the coffee beans.

A shaft 11 passes through the bearing member 7 and a gland packing 12 provides an air tight seal to prevent leakage around the shaft. The shaft 11 carries the rotatable element 13 of the grinder, the stationary element 14 of which is mounted near the lower end of the tubular shell. Secured to the lower end of the tubular shell in any suitable manner is a cage 15 providing a bearing for the lower end of the shaft, said cage having an annular ring 16 threaded to engage the lower end of the tubular shell and constituting an extension of the shell, and having a plurality of openings through which the ground coffee and the released gases may be discharged into the water, below the surface thereof, as hereinafter described.

Mounted on the shaft 11 immediately below the rotatable element 13 of the grinder is a rotatable member 17 having one or more blades 18 which extend across the space between the rotatable and stationary grinding elements and assist the discharge of the ground coffee into the water. In this connection, however, it is to be noted that the blades 18 are located entirely within the tubular shell and operate above the water level in the tubular shell. That is, since the tubular shell is sealed, the water in the container can only enter the bottom of the tubular shell in so far as the hydrostatic pressure of the water overcomes the atmospheric pressure within the shell, which means that the water level within the tubular shell is only very slightly above the bottom end of the shell before grinding begins. As soon as grinding begins, the release of carbon dioxide gas increases the pressure inside the shell, causing the water level to be lowered until the gas begins to escape from the shell into the surrounding water. As a result, the blades 18 do not stir the water, but operate dry above the water, merely to assist the discharge of the ground coffee into the water.

The shaft 11 may be driven in any suitable manner, either by hand, using a suitable crank, or by electric motor.

The apparatus above described may be used with or without a filter, and various types of filters may be used satisfactorily. However, I have shown in the drawings a form of filter which is particularly adapted for use in the present apparatus. Said filter comprises a cup 20 having fine perforations 21 in its vertical side walls and top wall but having an imperforate bottom wall. Said top wall 22 preferably is separable, as shown, so that the cup may be disassembled for cleaning. Said cup is mounted on a tube 23 of sufficient diameter to fit loosely over the tubular shell 6 and may be supported by a flange 24 resting on the rim of the container.

As the ground coffee is discharged into the cup, it tends to float upwardly to lodge against the imperforate top wall of the cup, this tendency being increased by the escaping carbon dioxide gas. Gradually, however, as the ground coffee absorbs water and as the gas bubbles are absorbed or dissipated, the ground coffee, and particularly the finer particles or sediment, may settle toward the bottom where it is retained by the imperforate bottom wall. At all times, however, the perforated side and top walls permit the infusion to pass freely from the cup into the container.

In making a coffee infusion, the desired quantity of coffee beans is introduced into the tubular shell through the neck 8 and the neck is then closed and sealed by the closure cap 9. In the meantime the desired quantity of water is heated to or near to the boiling point in the container 1, and the container and grinder unit are then assembled in substantially the relationship shown with the lower end of the tubular shell projecting well below the surface of the water. The shaft 11 is then rotated either by hand or by electric motor to grind the coffee beans and to discharge the ground coffee and released gas into the hot water at a point below the surface thereof. After grinding is completed, the rotation of the shaft may be stopped, but the container may be allowed to remain in place for from one to three minutes while infusion proceeds. When the infusion is completed, the container may be removed and the filter may be removed from the container.

It will be understood that the invention may be variously modified and embodied within the scope of the subjoined claims.

I claim as my invention:

1. Apparatus for making an infusion of coffee, comprising, a water container, a grinder unit projecting below the normal water level in said container, said grinder unit having a coffee bean compartment sealed with air tight closure, grinding means in said compartment, said compartment having a discharge opening below said grinding means, said grinding means being below the normal water level in said container but protected from contact with the water by the pressure existing in said sealed compartment, said discharge opening providing a passage through which ground coffee and carbon dioxide gas released during grinding may be discharged directly and continuously into the water below the surface thereof, and a bladed member mounted to rotate with said grinding means, said member being located between said grinding means and said discharge opening and also protected from contact with the water by the pressure existing in said compartment.

2. Apparatus for making an infusion of coffee, comprising, a water container, a grinder unit projecting below the normal water level in said container, said grinder unit comprising a cylindrical tubular shell providing a coffee bean compartment having its upper end sealed with air tight closure and having its lower end open, grinding means mounted near the lower end of said shell, said grinding means being below the water level in said container but protected from contact with the water by the pressure existing in said sealed compartment, said open lower end of said shell providing the sole discharge passage through which ground coffee and carbon dioxide gas released during grinding may be discharged directly and continuously into the water below the surface thereof, and a bladed member mounted to rotate with said grinding means, said member being located between said grinding means and the open lower end of the shell and also protected from contact with the water by the pressure existing in said compartment.

BORIS BOGOSLOWSKY.

REFERENCES CITED

The following references are of record in the file of this patent:

UNITED STATES PATENTS

| Number | Name | Date |
|---|---|---|
| 1,604,058 | Mager | Oct. 19, 1926 |
| 1,789,334 | Englung | Jan. 20, 1931 |
| 1,189,035 | Asbury et al. | June 27, 1916 |

FOREIGN PATENTS

| Number | Country | Date |
|---|---|---|
| 358,660 | Germany | Sept. 14, 1922 |
| 107,579 | Austria | Oct. 25, 1927 |